United States Patent
Urrego et al.

(10) Patent No.: US 12,367,167 B2
(45) Date of Patent: Jul. 22, 2025

(54) SYSTEMS AND METHODS FOR ENABLING CONCURRENT APPLICATIONS TO PERFORM EXTREME WIDEBAND DIGITAL SIGNAL PROCESSING WITH MULTICHANNEL COHERENCY

(71) Applicant: The MITRE Corporation, McLean, VA (US)

(72) Inventors: William Karl Urrego, Forest Hill, MD (US); Kevin Chenery Farr, Jr., Waltham, MA (US); Robert Harold Hudson, Bel Air, MD (US); Jeffrey D. Giovino, Melbourne, FL (US); Edward Michael Fennell, IV, Middletown, NJ (US); Blake Anthony Hamilton, Abingdon, MD (US)

(73) Assignee: The MITRE Corporation, McLean, VA (US)

( * ) Notice: Subject to any disclaimer, the term of this patent is extended or adjusted under 35 U.S.C. 154(b) by 605 days.

(21) Appl. No.: 17/686,117

(22) Filed: Mar. 3, 2022

(65) Prior Publication Data
US 2022/0283880 A1    Sep. 8, 2022

Related U.S. Application Data

(60) Provisional application No. 63/156,572, filed on Mar. 4, 2021.

(51) Int. Cl.
*G06F 13/38* (2006.01)
*G06F 13/16* (2006.01)

(52) U.S. Cl.
CPC ........ *G06F 13/387* (2013.01); *G06F 13/1673* (2013.01); *G06F 2213/2806* (2013.01)

(58) Field of Classification Search
CPC .... G06F 13/387; G06F 13/1673; G06F 9/544; G06F 13/16; G06F 2213/2806
See application file for complete search history.

(56) References Cited

U.S. PATENT DOCUMENTS

| 9,747,480 | B2 * | 8/2017 | McAllister | H01Q 11/08 |
| 11,403,154 | B1 * | 8/2022 | Agarwal | G06F 9/5005 |

* cited by examiner

*Primary Examiner* — An H Do
(74) *Attorney, Agent, or Firm* — Morrison & Foerster LLP

(57) ABSTRACT

A method for digital signal processing of sensor data includes receiving digitized samples of sensor signals via a network connection; converting the digitized samples into a standardized format; storing the converted digitized samples in a shared memory data structure in memory of a single instruction multiple data (SIMD) processor; and providing zero-copy read access to the converted digitized samples stored in the shared memory data structure to a plurality of applications.

35 Claims, 7 Drawing Sheets

SYSTEMS AND METHODS FOR ENABLING CONCURRENT APPLICATIONS TO PERFORM EXTREME WIDEBAND DIGITAL SIGNAL PROCESSING WITH MULTICHANNEL COHERENCY

CROSS REFERENCE TO RELATED APPLICATIONS

This application claims the priority of U.S. Provisional Application No. 63/156,572, filed Mar. 4, 2021, the entire contents of which is incorporated herein by reference.

FIELD OF THE DISCLOSURE

This disclosure generally relates to digital signal information and more specifically to ingestion and processing of digital signal information.

BACKGROUND OF THE DISCLOSURE

Electromagnetic waves can be used to carry signal information across great distances. In order to appropriately process signal information carried by the electromagnetic waves, it can be useful to identify specific attributes about the signal. For instance, identifying certain attributes related to a signal can help to determine whether the signal is from a man-made source or is simply just noise. Artificial intelligence can be used to aid in identifying certain attributes of electromagnetic signals. However, the use of artificial intelligence techniques to process data for signal recognition is limited by the data processing capabilities of the underlying hardware used to facilitate that processing. For instance, with respect to collecting signal data, computing equipment (such as a laptop, a computer, and a server) are limited to data ingestion throughputs of at most about 20 Megahertz (MHz) instantaneous bandwidth of spectrum of the electromagnetic spectrum. Traditionally, the collected signal data of 20 MHz of spectrum or less can be shared to an external processing application by copying the collected signal data to the external application. The processing application can perform its digital signal processing on its copy of the data. However, copying collected signal data that includes more than 20 MHz of spectrum to share the collected data with a processing application can tie up computer resources and lead to system bottlenecks or failure.

SUMMARY OF THE DISCLOSURE

As described above, current technologies and computing equipment are limited to processing about 20 MHz instantaneous bandwidth of spectrum. Currently, this limit can be extended to approach 100 MHz of instantaneous bandwidth of spectrum on a multitasking operating system using computer hardware with greater than 50 central processing units (CPUs) cores. The systems and methods described herein provide spectrum processing at data ingestion throughputs of more than 20 MHz instantaneous bandwidth of spectrum on a laptop, computer system, or on a single rack server for subsequent extreme wideband processing. According to some embodiments, the systems and methods described herein can process data ingested at more than 500 MHz instantaneous bandwidth of spectrum, and structure the ingested data to enable sharing the more than 500 MHz of spectrum on a laptop, computer system, or on a single rack server with a plurality of applications. The sharing of the structured data is done without copying the structure to each application that would like to access the data.

According to various embodiments, a method for digital signal processing of sensor data includes receiving digitized samples of sensor signals via a network connection; converting the digitized samples into a standardized format; storing the converted digitized samples in a shared memory data structure in memory of a single instruction multiple data (SIMD) processor; and providing zero-copy read access to the converted digitized samples stored in the shared memory data structure to a plurality of applications.

In any of these embodiments, the digitized samples can be of the radio frequency electromagnetic spectrum. The digitized samples may be received from one or more software defined radios.

In any of these embodiments, receiving the digitized samples can include using direct memory access (DMA) to direct network packets comprising the digitized samples from a network interface card (NICs) directly to the memory of the SIMD processor. In some embodiments, the SIMD processor parses the packets to extract the digitized samples.

In any of these embodiments, the method may include receiving meta-data associated with the digitized samples, wherein the digitized samples are converted into the standardized format using the meta-data. In some embodiments, the meta-data includes information associated with a system that generated the digitized samples and converting the digitized samples into the standardized format may include converting the digitized samples from values that are relative to the system that generated the digitized samples to absolute values. The shared memory data structure may include a circular buffer and the circular buffer is free of the meta-data.

In any of these embodiments, the shared memory data structure may include a circular buffer. In some embodiments, the circular buffer may be continuously updated as at least one of the plurality of applications accesses the converted digitized samples in the circular buffer.

In any of these embodiments, the SIMD processor may be a graphics processing unit (GPU).

In any of these embodiments, the converted digitized samples stored in the shared memory data structure may be accessible in parallel by at least two of the plurality of applications.

In any of these embodiments, the method may include executing a first processing routine from a first application of the plurality of applications to yield first processed samples and storing a copy of the first processed samples in a second shared memory data structure in the memory of the SIMD processor. In any of these embodiments, the method may include executing a second processing routine from the first application or a second application of the plurality of applications on the first processed samples in the second shared memory data structure to yield second processed samples. In any of these embodiments, the first processing routine may be performed independent of a processing speed of the second processing routine.

In any of these embodiments, storing the converted digitized samples may include storing a first set of digitized samples associated with a first RF tuner in a first shared memory data structure and storing a second set of digitized samples associated with a second RF tuner in a second shared memory data structure.

In any of these embodiments, the digitized samples may include mmWave radar data or LiDAR data.

According to some embodiments, a system for digital signal processing of sensor data includes one or more processors; memory; and one or more programs stored in the memory and configured for execution by the one or more processors, the one or more programs including instructions for: receiving digitized samples of sensor signals via a network connection, converting the digitized samples into a standardized format, storing the converted digitized samples in a shared memory data structure in memory of a single instruction multiple data (SIMD) processor, and providing zero-copy read access to the converted digitized samples stored in the shared memory data structure to a plurality of applications.

In any of these embodiments, the digitized samples may be of the radio frequency electromagnetic spectrum. In any of these embodiments, the system may be configured to receive the digitized samples from one or more software defined radios.

In any of these embodiments, receiving the digitized samples may include using direct memory access (DMA) to direct network packets comprising the digitized samples from a network interface card (NICs) directly to the memory of the SIMD processor. In any of these embodiments, the SIMD processor may be configured to parse the packets to extract the digitized samples.

In any of these embodiments, the one or more programs may include instructions for receiving meta-data associated with the digitized samples, wherein the digitized samples are converted into the standardized format using the meta-data. In any of these embodiments, the meta-data may include information associated with a system that generated the digitized samples and converting the digitized samples into the standardized format may include converting the digitized samples from values that are relative to the system that generated the digitized samples to absolute values. In any of these embodiments, the shared memory data structure may include a circular buffer and the circular buffer is free of the meta-data.

In any of these embodiments, the shared memory data structure may include a circular buffer. In any of these embodiments, the one or more programs may include instructions for continuously updating the circular buffer as at least one of the plurality of applications accesses the converted digitized samples in the circular buffer.

In any of these embodiments, the SIMD processor may be a graphics processing unit (GPU).

In any of these embodiments, the converted digitized samples stored in the shared memory data structure may be accessible in parallel by at least two of the plurality of applications.

In any of these embodiments, the one or more programs may include instructions for executing a first processing routine from a first application of the plurality of applications to yield first processed samples and storing a copy of the first processed samples in a second shared memory data structure in the memory of the SIMD processor. In any of these embodiments, the one or more programs may include instructions for executing a second processing routine from the first application or a second application of the plurality of applications on the first processed samples in the second shared memory data structure to yield second processed samples. In any of these embodiments, the one or more programs may include instructions for performing the first processing routine independent of a processing speed of the second processing routine.

In any of these embodiments, the one or more programs may include instructions for storing a first set of digitized samples associated with a first RF tuner in a first shared memory data structure and storing a second set of digitized samples associated with a second RF tuner in a second shared memory data structure.

In any of these embodiments, the digitized samples may include mmWave radar data or LiDAR data.

According to some embodiments, a non-transitory computer readable storage medium stores one or more programs that include instructions, which when executed by a computing system, cause the computing system to perform any of the methods above.

BRIEF DESCRIPTION OF THE DRAWINGS

The disclosure will now be described, by way of example only, with reference to the accompanying drawings, in which.

DETAILED DESCRIPTION OF EXEMPLARY EMBODIMENTS

Figure 1:
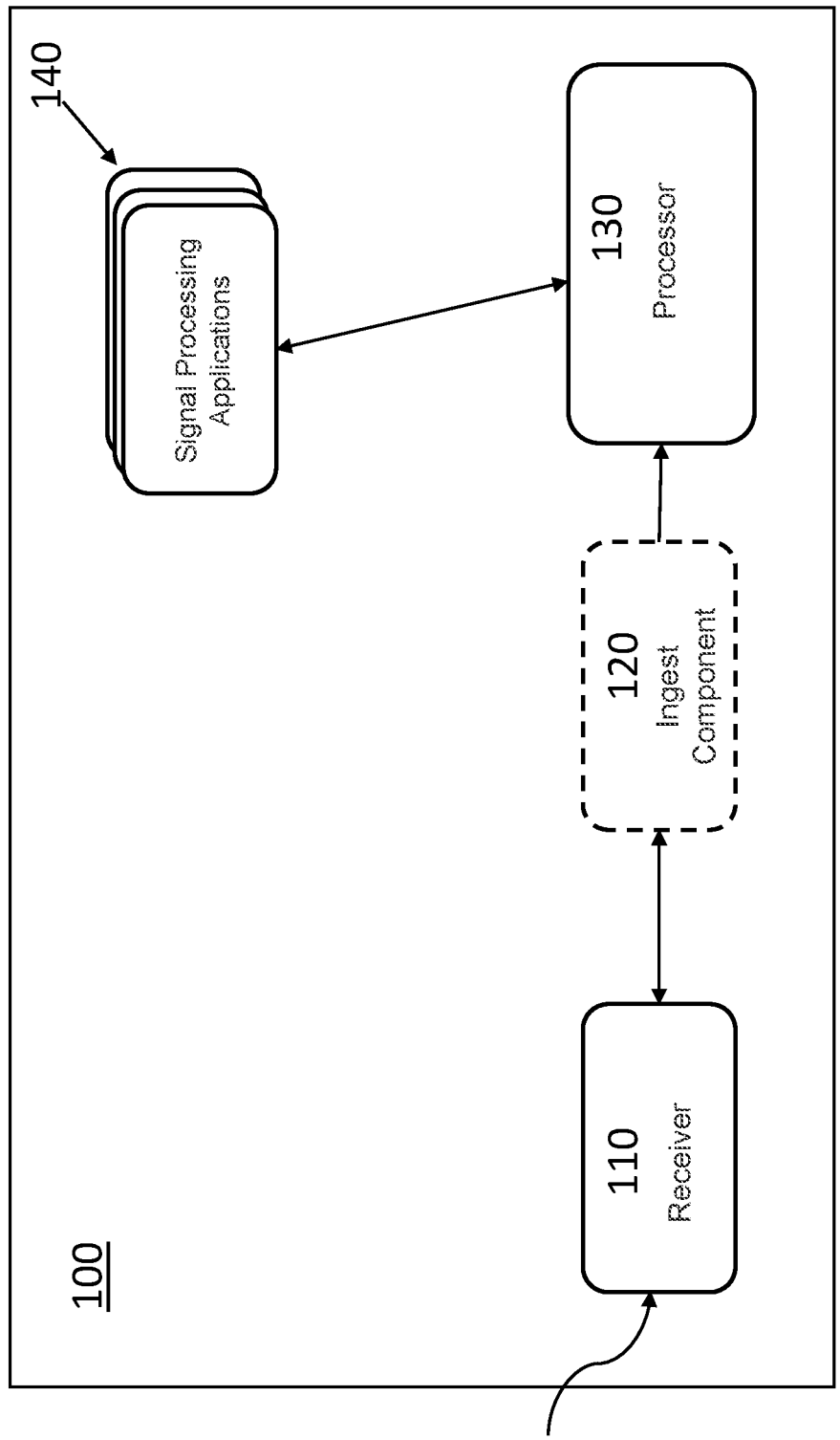
FIG. 1 illustrates a block diagram of an exemplary signal processing system of a computing device, according to some embodiments.

Described herein are systems and methods for processing and sharing extreme wideband spectrum data. The extreme wideband spectrum data may be analog measurements of electromagnetic radiation that are collected by one or more external sensors such as radios. The extreme wideband spectrum data may be, for example, on the order of a gigahertz of electromagnetic spectrum or one billion samples every second. The spectrum data may be digitized by the one or more external sensors. The digitized spectrum data can be transferred to a processing unit for identification and processing of signal information carried by the electromagnetic radiation. The processing unit may ingest the digitized wideband spectrum data at a throughput of more than 20 MHz of spectrum, accelerate and parallelize processing of the ingested spectrum data, and structure the ingested spectrum data for effective sharing of extreme wide band spectrum data. Structuring the data may include converting the data using mathematical transformations. The structured data are stored in digital signal processing shared memory data structures (also referred to herein interchangeably as "DSP taps" or buffers) and can be accessible to a plurality of applications via zero-copy shared access which allows the plurality of applications parallel access to the structured data without data copying. In this way, hundreds and thousands of megahertz of spectrum may be processed by a processing unit of a laptop or computer and thousands of megahertz of spectrum may be processed by a processing unit of a server. Such data ingest and subsequent data sharing exceeds the signal processing of conventional frameworks (such as GNU radio, X-Midas, and RED-HAWK) of tens of megahertz of spectrum on a laptop, computer, or a server.

Conventionally, sharing of data for signal processing applications includes copying at least a portion of the data to each signal processing application. This conventional framework of copying structured data to share with multiple applications is only feasible for small amounts of data (such as 20 Megahertz of spectrum or less) in which copying a portion or all of the data would not choke the data processing system. However, for sharing large amounts of data (on the order of a gigahertz of electromagnetic spectrum or one billion samples every second), copying the data is not feasible because systems are not configured to ingest and copy that much data. Furthermore, copying the structured data can be computationally burdensome and time consuming for the applications attempting to access the data.

According to some embodiments, the systems and methods described herein allow for a continuous ingestion, processing, and sharing of extreme wideband spectrum data. That is, the data shared is continuously changing based on the continuously changing data ingestion on the order of a billion samples per second.

According to some embodiments, the structured data is accessible by each application of the plurality of applications and can be shared with each application without requiring each application to makes its own copy of the structured data. The zero-copy shared access allows sharing of large amounts of data (on the order of a gigahertz of electromagnetic spectrum or one billion samples every second) to several applications without copying. The zero-copy shared access enables efficient sharing across the plurality of applications and avoids exhausting computational resources of the computing devices, an application, or a combination thereof. Furthermore, through the zero copy shared access, an application can start reading data at any available time or can start reading the data at any part of the data regardless of how other applications are reading the same shared data. In this way, large amounts of data may be shared with tens, hundreds, or thousands of applications.

According to some embodiments, the systems and methods can include commercial off-the-shelf components. For example, a processing unit may be or include a parallel computing processing unit, such as a graphics processing unit (GPU) or Field Programmable Gate Array (FPGA).

According to some embodiments, the systems and methods described herein use a region of system or device memory as a zero-copy buffer sized to handle dormant portions of an application during operating system (OS) context switching so that when the application is no longer dormant, it is not behind in terms of accessing the continuous stream of samples. In other words, a shared memory data structure is configured as a buffer so that samples are not lost while the application is asleep. According to some embodiments, the systems and methods described herein allow structured samples of extreme wideband radio frequency (RF) spectrum to fan out across containment bounds, classification bounds, and application threads without loss of signal and without requiring external applications to copy the structured data to perform digital signal processing on the structured data.

According to some embodiments, the ingested samples (representations of the electromagnetic waveform) are not marshalled. That is, the ingested samples are not segmented, copied across application spaces, further packetized, individually decorated with metadata, or placed into separate buffers. Instead, the ingested samples are placed into a circular buffer that is continuously updated as new data is received. The unmarshalled samples allow for more efficient digital data processing and sharing.

According to some embodiments, the digital signal processing block chain described herein does not exert back pressure. That is, there is no downstream backpressure exerted on upstream processing elements. Back pressure can include a type of notification to slow down a processing speed. For example, existing digital signal processing frameworks are written to use samples at a processing speed that the frameworks can handle, and the frameworks execute block-by-block processing of signal elements. If one processing block is really slow, it can notify the producer from which it is receiving its signal to slow down or wait to allow the one processing block to in essence catch up. Such notification is an example of back pressure. The digital signal processing system and associated methods described herein do not exert back pressure. In other words, a speed of upstream processing blocks can be independent of a speed of downstream processing blocks. Without back pressure, digital signal processing block chain can perform at processing speeds on the order of one billion samples per second or a gigahertz of electromagnetic spectrum to fan out across hundreds of applications. According to some embodiments, the no-back pressure configuration is based at least on error handling and the expectation that the applications perform error handling at integration time, otherwise it's a system failure.

The systems and methods described herein can be configured for ingesting and providing zero-copy access to data from any type of sensor system that provides real-time measurement data communicated over a high-speed network. This can include radio systems, as discussed above, and can also include mmWave systems and LiDAR systems. However, it should be understood that this list of sensor systems is merely exemplary and the systems and methods herein are not limited to handling data from these sensor systems. Rather, the systems and methods described herein can be configured to receive and process packetized data from any sensors that provide real-time measurement data across high-speed network interfaces and/or PCIe interfaces. The systems and methods described herein can enable efficient parallel processing of the digital sensor data received in network packets from one or more sensor systems (e.g., a radio system, a LiDAR system, a mmWave system). Network packets containing the digital sensor data may be directed from a network card directly into memory of one or more single instruction multiple data (SIMD) processors, such as one or more GPUs. This is in contrast to the conventional handling of network packets in which the network card and a CPU coordinate to copy over undecoded network packets into RAM and then the CPU decodes the packets and then copies data within the packets into, for example, GPU memory for further handling and processing. Since this conventional process relies on CPU processing, the data ingestion and subsequent data processing is limited to CPU benchmarks. Further, the copying of network packets into RAM alone can exhaust computational resources and lengthen a time to further handle and process the network packets. In contrast, the systems and methods described herein can bypass the CPU and RAM and direct packets directly to the memory of a SIMD processor (e.g., GPU) that parses the packets to extract the sample within, converts the samples to a standard format that is agnostic to the source of the samples, and stores the standardized data in a DSP tap (buffer) that allows zero-copy access to the data.

According to some embodiments, RF samples (or samples of any type of sensor system) and associated metadata can be packetized and transmitted to a computing system from one or more software defined radios (or other sensor system). The one or more software defined radios can transmit the network packets to a network card of the computing system. A software defined radio can measure and digitize samples of RF energy that hit antenna operatively connected to the software defined radio. The software defined radio can then packetize the digitized samples and metadata associated with the samples into network packets and transmit the network packets to a computing system for processing of the samples.

The network packets may be directed directly to memory of one or more SIMD processors. The packets may be parsed and the RF samples within processed by the SIMD processor. The ingestion from the network card directly into the one or more SIMD processors can be done using direct memory access (DMA). That is, network packets that pass through the network card are copied directly into GPU memory across a PCI bus via DMA. Copying the network packets directly into GPU memory avoids the operating system's CPU network stack. Use of DMA bypasses CPU and host RAM allowing for direct access to the memory of the one or more SIMD processors and computations on the network packets can be done in the one or more SIMD processor. The computations may include extracting RF samples from network packets, converting RF samples into a standardized format, and writing the converted RF samples into a shared memory data structure in the SIMD processor memory for efficient parallel digital signal processing and zero-copy shared access. The shared memory data structure may be a circular buffer in the SIMD processor memory.

According to some embodiments, the extracted digitized samples may be 16-bit signed integers representing I and Q values of RF samples. Digital signal processing in the SIMD processor can be implemented to scale and register the extracted digitized RF samples. Scaling the samples can be done by transforming the signed integers into floating point numbers such as a 32-bit float. The transformation to floating point numbers avoids downstream precision errors associated with 16-bit signed integers. According to some embodiments, the floating point numbers can be registered to an absolute unit. Registering to an absolute unit means that the complex values of the RF are changed from relative to an absolute representation in volts. According to some embodiments, metadata associated with the RF samples can be extracted from the network packets and used to transform the RF samples.

Once extracted, scaled, and registered, the RF samples can be aligned in time and stored in one or more buffers (DSP taps). According to some embodiments, digitized RF samples from different tuners (of the same software defined radio and/or different software defined radios) are stored in separate buffers in such a way that time coherency is maintained between the different buffers. That is, position in the buffer array may indicates timing information since the buffers are populated to maintain time coherency. Time coherency across buffers enables reading same coincident RF samples in time from each buffer array. For example, a first buffer array is populated with data from a first antenna and a second buffer array is populated with data from a second antenna in such a way that the same index in each buffer is associated with the same instant in time. To illustrate, the first buffer array includes an index A0 and the second buffer array includes an index B0, each of which indicates time zero, and the data in index A0 and in index B0 were captured by different tuners at the same time. This makes the first and second buffer arrays coherent in time.

According to some embodiments, different buffers can be used to store one or more streams of information from the RF samples capture by an antenna. For example, a larger buffer can be used to store one or more broader spectrum of information. Computation can be done on the information stored in the larger buffer to extract one or more narrow streams of information that can then be stored in a smaller buffer. Such a computation can be done by one or more microservices.

According to some embodiments, buffers can be distributed across one or more SIMD processors. For example, a first GPU can be tasked to perform an operation on data stored in a second GPU.

According to some embodiments, the buffers include no metadata. This distinguishes the RF samples stored in the DSP taps from the raw RF samples packetized with metadata in network packets by the software defined radio. Aggregating continuous RF data in circular buffers in DSP taps, allows access for external applications to look at continuous RF data captured over time. The limit in how far back in time data will be accessible is based on a size of the circular buffer. Configuring the memory data structure of the DSP taps in this way provides an fast and efficient parallel process at least because when a kernel is launched on the GPU to look at RF data: (1) the data is already in SIMD processor memory so there is no waiting for data to arrive in SIMD memory and (2) the time coherency across the circular buffers of different DSP taps makes it efficient for each co-processor to identify which index in the circular buffer arrays are required to accomplish the kernel task.

Using the DSP API discussed previously, applications can access the data stored in buffers of the DSP taps. According to some embodiments, a DSP API can be used to access metadata about DSP taps. Such metadata can include radio identification, speed at which the DSP tap is being written, size of the DSP tap, what is the center frequency of the signal at which the DSP tap is being populated, etc.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

In the following description, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general-purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

FIG. 1 illustrates a functional block diagram of an exemplary computing system 100, according to some embodiments. According to some embodiments, the system 100 is configured for ingesting and processing large amounts of data received over a packetized network connection to a sensor system. For example, the system can be configured for ingesting and processing extreme wideband electromagnetic spectrum data (on the order of one billion samples per second or one gigahertz of spectrum). The system 100 includes a receiver 110, an ingest component 120, and one or more processors 130. According to some embodiments, the one or more processors 130 may include the ingest component 120 shown in dashed lines. The system 100 may be implemented in a computing device running a multi-tasking operating system such as a personal computer, an embedded system-on-chip (SoC), a high-performance computer, or a server. The computing device can be for example, a laptop, a network appliance, a high-performance computer (HPC), or a mobile phone.

According to some embodiments, the system 100 can receive packets containing digitized samples of analog measurements of sensor signals, such as radio frequency electromagnetic spectrum sensor signals, through the receiver 110 and provide access to signal information associated with the analog measurements to a plurality of applications 140. The receiver 110 can be a network interface card that receives packets from one or more sensor systems, such as one or more software defined radios (SDRs), one or more LiDAR sensors, and/or one or more mmWave radar sensors. It should be understood that these sensor systems are merely exemplary and the systems and methods herein are not limited to handling data from these sensor systems. Rather, the systems and methods described herein can be configured to receive and process packetized data from any sensors that provide real-time measurement data across high-speed network interfaces and/or PCIe interfaces.

The sensor systems, such as the one or more SDRs, convert the analog measurements into digital samples, packetize the digital samples, and transmit the packetized digital samples (referred to herein as samples) to the receiver 110. For example, one or more SDRs generate digital samples of the electromagnetic spectrum, packetize the samples, and transmit the packetized samples to the receiver 110 over a network connection, such as an Ethernet connection. The packets are directed from the receiver to the one or more processors 130 via the ingest component 120 across a high-speed communication interface such as Ethernet, fiber, or peripheral component interconnect express (PCIe) interface. The ingest component 120 can be a modular high-speed ingest component that can receive the samples and the metadata from the receiver 110 via ingest techniques such as traditional OSI network stack with a standard Network Interface Card (NIC), Direct Memory Access (DMA) techniques, or network stack intercept libraries (e.g. libpcap) with a standard NIC. For example, receiving the digitized samples via DMA may include directing samples from NICs directly to memory of an SIMD processor. The ingest technique may be selected based on the type of receiver 110 and hardware associated with the receiver 110. According to some embodiments, the ingest techniques may use dynamically linked binary executable routines compiled as system and software libraries that are commercially available and custom code configured to build on the commercially available libraries and apply the libraries to the data structures described herein.

According to some embodiments, the samples may be converted into a different format and the converted samples are stored in shared memory data structures in one or more physical memory locations associated with the one or more processors 130. The conversions may be accelerated in parallel by a parallel processor of the one or more processors 130. The conversions may include upfront signal processing calculations based on metadata included in the packets received by the receiver 110. The conversions may include mathematical transformations. The converted data may be stored in the shared memory data structures, which may be configured to provide zero-copy access to the converted data to one or more applications of the plurality of applications 140.

Each application of the plurality of applications 140 can request access to the converted samples stored in the shared memory data structures in the memory of the one or more processors 130. The one or more processors 130 may grant access based at least on the permissions associated with the application governed by the operating system. The applications that have been granted access to the shared memory data structures may simultaneously perform zero-copy reads of the transformed samples stored in shared memory data structures. For example, applications that have been granted access to the shared memory data structures may simultaneously perform zero-copy reads of the converted samples. In this way, the converted samples are shared with the plurality of applications that have been granted access. According to some embodiments, one or more applications that have been granted access can read the converted data in parallel with other applications that have been granted access. According to some embodiments, the one or more processors 130 is configured to ingest, transform, structure, and share large amounts of data (on the order of one billion samples per second or a gigahertz of electromagnetic spectrum). According to some embodiments, the one or more processors 130 continuously ingests, converts, structures, and shares digitized electromagnetic spectrum data.

The one or more processors 130 may include a general purpose processor, such as a CPU, and one or more SIMD processors, such as one or more GPUs, and the samples may be stored in shared memory data structures of the CPU and/or the one or more SIMD processors.

Figure 2:
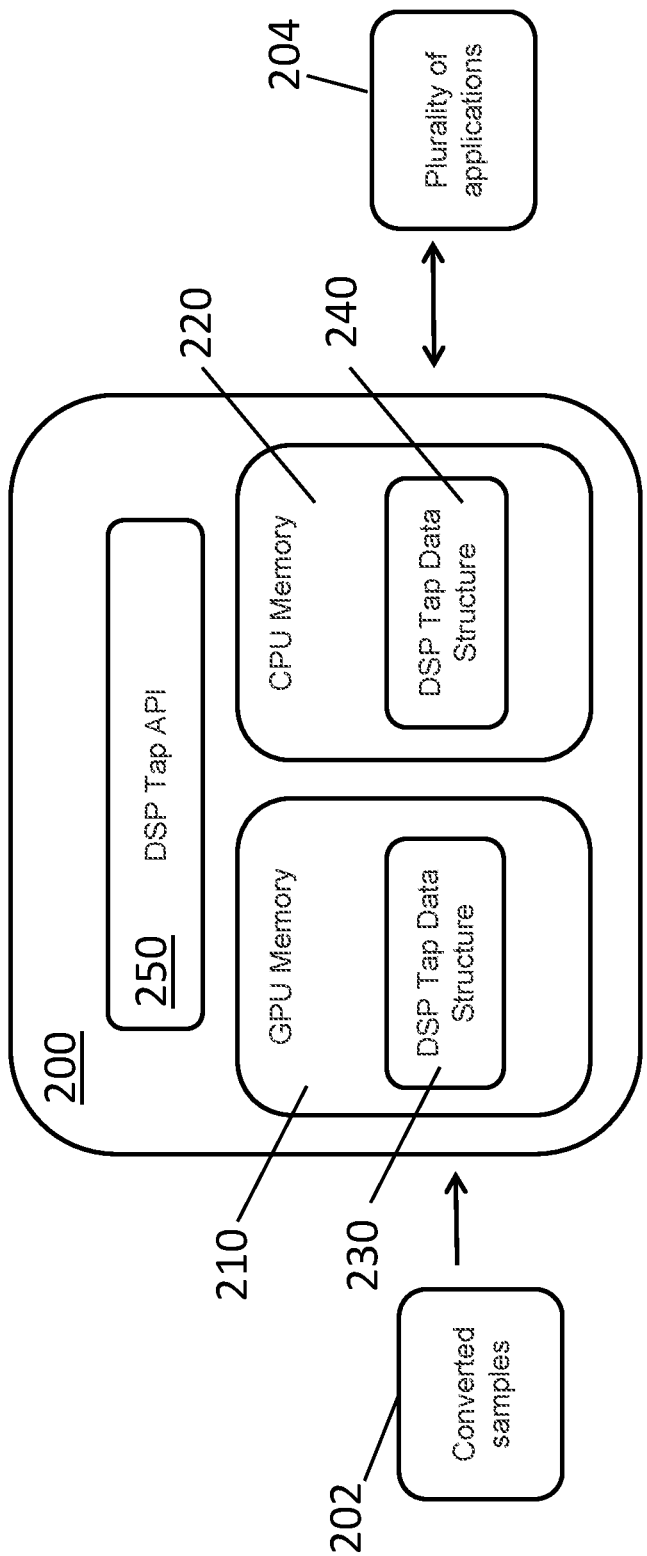
FIG. 2 shows an example of a digital signal processer, according to some embodiments.

FIG. 2 is a functional block diagram of a DSP tap architecture 200 for storing sensor data in one or more DSP taps for allowing zero-copy access to the data. The DSP tap architecture 200 may receive converted digitized electromagnetic samples 202 that have a standardized format, meaning the sample values are presented as integers with a system specific bit range that represents a full sweep of the waveform, and store the converted digitized samples 202 in one or more DSP tap data structures 230 such that the converted digitized samples 202 are shareable to a plurality of applications 204. The plurality of applications 204 may be external applications. The plurality of applications 204 may be signal processing applications. According to some embodiments, the DSP tap architecture 200 may be configured to receive metadata associated with samples 202. The metadata may be used to convert normalized magnitudes that are relative values of electrical potential of samples 202 into a standardized format of absolute values of electrical potential in volts. The standardized format measured in volts, may be a concise representation of the electromagnetic spectrum of samples 202 that can be read by a plurality of applications. The standardized format may be configured for parallel processing and may include single precision floating numbers. The plurality of applications 204 may access the samples in the DSP tap(s) of the DSP tap architecture 200. The DSP tap architecture 200 may receive processing routines from the plurality of applications 204 for performing digital processing on the converted digitized samples stored in the DSP tap architecture 200. The DSP tap architecture 200 may include one or more DSP tap data structures 230 in an SIMD processor (e.g., GPU) memory 210 and/or one or more DSP tap structures 240 in a general processor (e.g., CPU) memory 220. A DSP tap data structure 230, 240 is a shared memory data structure that describes how the transformed packetized digital measurements are laid out in computer memory. A DSP tap includes the DSP data structures 230, 240 and the DSP tap provides non-destructive shared memory access to RF samples (I-Q and Spectral data) flowing within a wideband spectrum processing system to the plurality of applications. According to some embodiments, the DSP tap may include a DSP tap application program interface (API) 250 that can provide information about the data stored in the one or more DSP taps.

As illustrated schematically in the example of FIG. 2, copies of the converted digitized samples may be stored in SIMD processor memory 210 and/or general processor memory 220. According to some embodiments, the DSP tap data structures 230, 240 may have the same data structure. Samples produced from subsequent processing of the converted digitized samples may be stored in another DSP tap data structure in at least one of the one or more memories 210, 220. The digital signal processer 200 can receive the transformed digital measurements in the standardized format, structure the transformed digital measurements into DSP tap data structures 230, 240, and store the transformed digital measurements in DSP tap data structures 230, 240. A plurality of applications can access the transformed packetized digital measurements via the DSP tap data structures 230, 240.

The DSP tap data structures 230, 240 are created using one or more interchange technologies on a host computer, in GPU device memory, and other heterogeneous devices memory on the system. The interchange technology may efficiently share wideband spectral data across multiple process and containment boundaries. Examples of such interchange technology may include the use of Inter Process Communications (IPC) like CUDA IPC and POSIX Shared Memory. The handle to DSP tap data structures 230, 240 are stored as a special device file on the computers file system.

According to some embodiments, transformed samples may be received from an ingest component and stored in one or more DSP tap data structures 230, 240 in one or more memories 210, 220 (such as GPU memory or computer RAM) of the computing device. The DSP tap architecture 200 may have access to the traditional RAM of the computing device to store the transformed samples. According to some embodiments, an application code that runs on an SIMD processor can read data from the SIMD processor memory 210 (such as GPU memory) and an application code that runs on the general purpose processor can read data from the system's RAM 220. According to some embodiments, the DSP tap API 250 allows the data to be read from one or both memory locations depending on which hardware runs the code for a given application or application thread.

The one or more DSP tap data structures 230, 240 stored in one or more memories 210, 220 may be accessible via the DSP tap API 250. The DSP API 250 includes code for accessing the DSP tap data structures 230, 240 in the one or more memories 210, 220. Through the DSP Tap API 250, a plurality of applications 204 can access the DSP tap architecture 200 to simultaneously perform zero-copy reads of the transformed digital measurements in the one or more memories 210, 220.

According to some embodiments, the DSP tap architecture 200 creates DSP tap data structures 230, 240 and makes the DSP tap data structures 230, 240 available to the plurality of applications 204. According to some embodiments, the plurality of applications 204 can request access to the transformed samples stored in the DSP tap data structures 230, 240 in the one or more memories 210, 220 through the DSP tap API 250. Should the application gain access to the DSP tap data structures 230, 240, the applications can read the transformed samples and perform computation and analysis in the processor code of the DSP tap architecture 200. According to some embodiments, one or more applications can use the DSP tap API 250 to read the samples in the DSP tap data structures 230, 240 using zero copy techniques available on the system, such as using Unix/Linux shared memory or NVIDIA CUDA IPC memory. Meaning that if application A, B, and C are all reading the same piece of information, each application is not reading a copy of the same piece of information. Instead, each application can read the same piece of information in parallel. With the zero copy shared access, the system's memory does not have to exhaust computational resources trying to copy large amounts of data for each application attempting to access the data. Such an attempt to copy the large amounts of data (on the order of one billion samples per second or a gigahertz of electromagnetic spectrum) would consume the system's memory and require more memory than the system offers. Additionally, a system cannot copy such large data fast enough to keep up with the large ingest of more than 20 Megahertz of spectrum.

Figure 3:
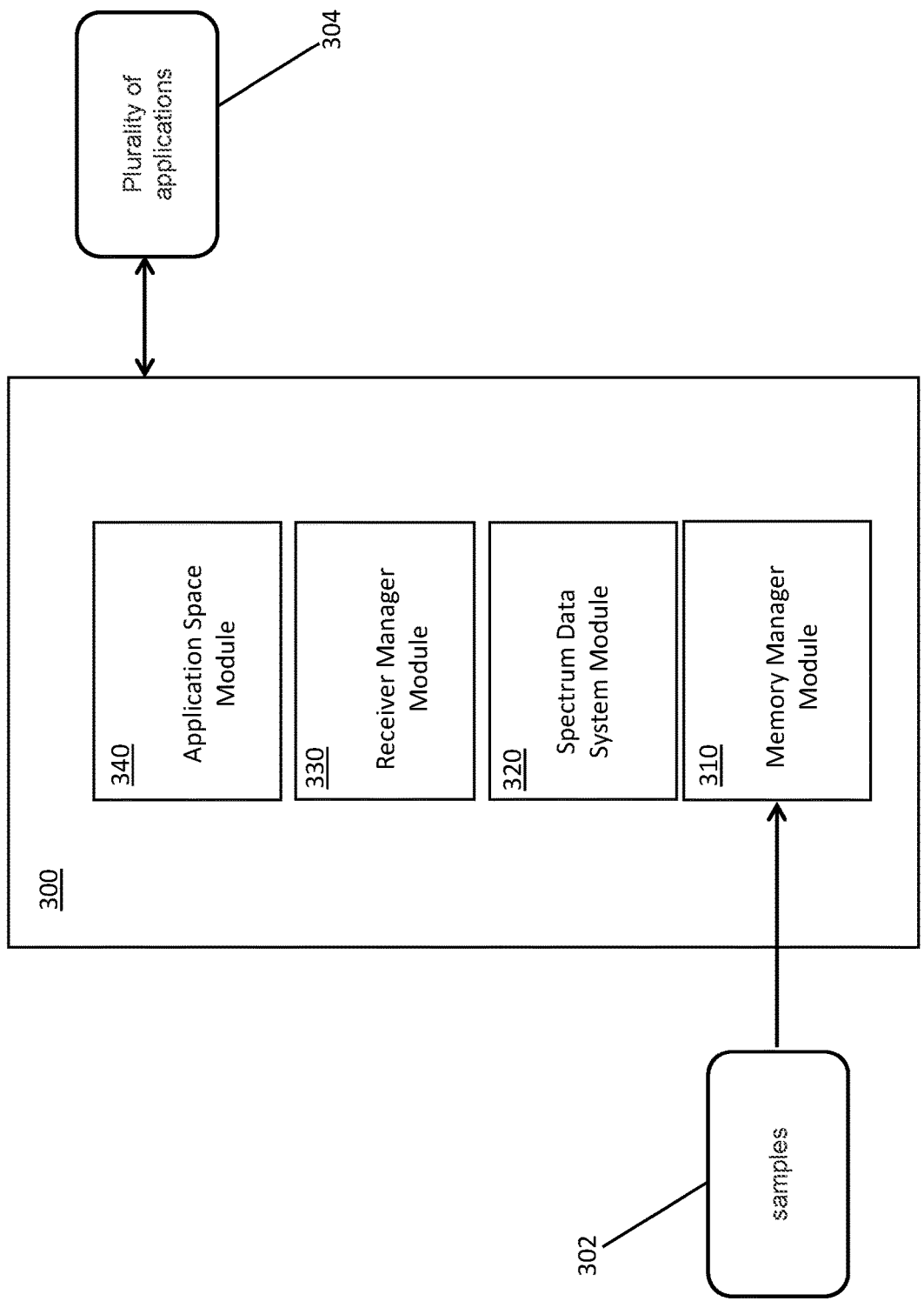
FIG. 3 shows an example of a digital signal processer, according to some embodiments.

FIG. 3 shows another example of a digital signal processing system, according to some embodiments. The digital signal processing system 300 of FIG. 3 may receive digitized electromagnetic samples 302 and process the digitized samples such that the processed digitized samples are accessible to a plurality of applications 304. The plurality of applications 304 may be external applications. The plurality of applications 304 may be signal processing applications. The digital signal processing system 300 may receive processing routines from the plurality of applications 304 for performing digital processing on the converted digitized samples stored in the digital signal processing system 300. The digital signal processing system 300 may include a memory manager module 310, a spectrum data system module 320, a receiver manager module 330, and an application space module 340. According to some embodiments, the memory manager module 310 uses memory access techniques to transfer time coherent multi-channel spectrum streams across networks to the digital signal processing system 300. The spectrum data system module 320 maps wideband spectral data onto processing unit memory structures and/or system memory structures, and uses an interchange technology to share wideband spectral data mapped into the memory structures across multiple process space boundaries. The receiver manager module 330 allows for microservices from the plurality of applications to be used to control a receiver system or build on the application space module 340. The application space module 340 allows for parallel digital signal processing of the samples stored by the digital signal processing system 300 via processing routines provided by the plurality of applications 304.

Figure 4:
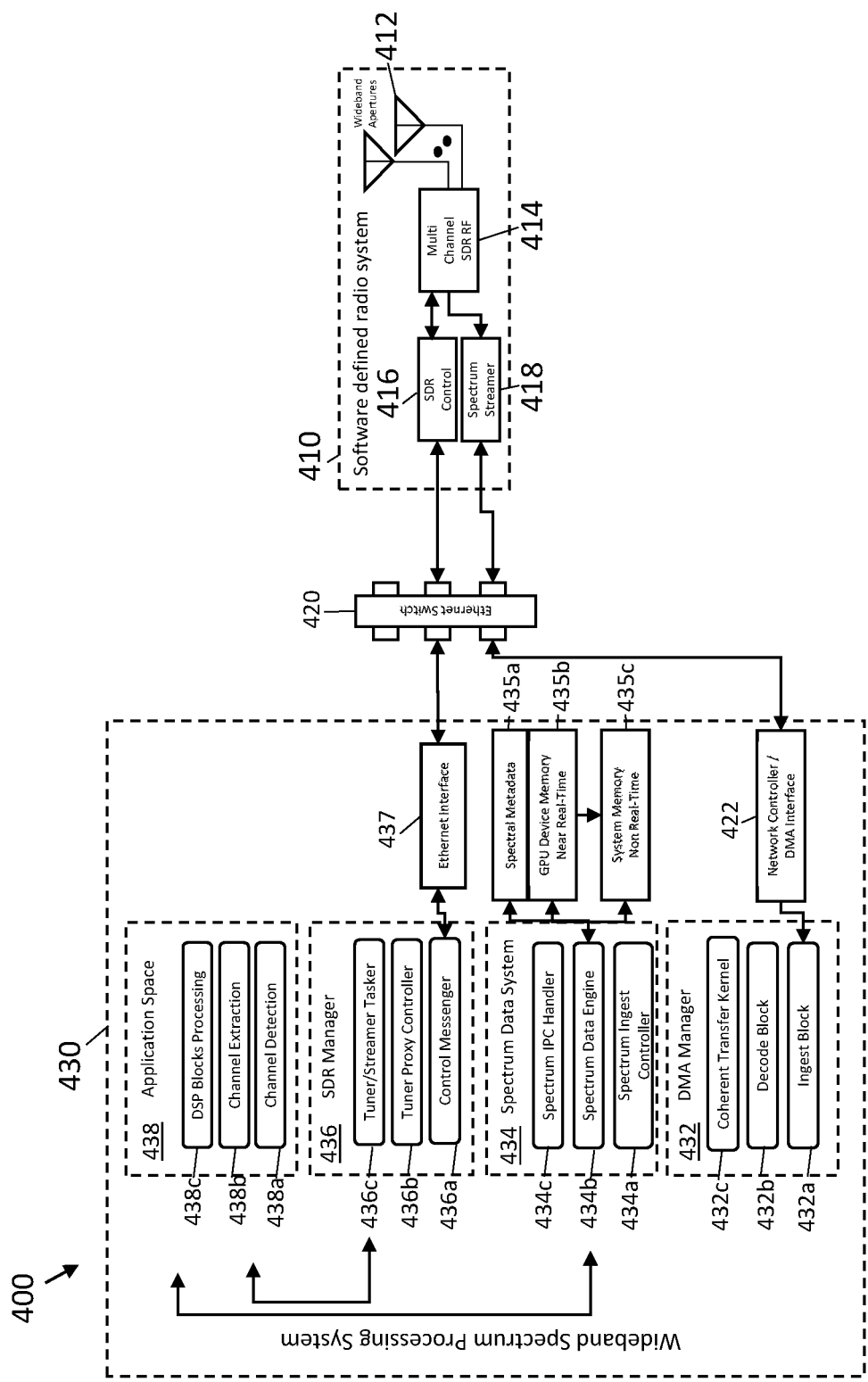
FIG. 4 illustrates a block diagram of an exemplary signal processing system of a computing device, according to some embodiments.

FIG. 4 illustrates a block diagram of an exemplary signal processing system 400 of a computing device, according to some embodiments, that utilizes DMA techniques for data ingestion. Signal processing system 400 includes a software defined radio system 410, a communication interface 420, and a digital signal processor 430. The digital signal processor 430 may be an SIMD processor or include multiple SIMD processors. The software defined radio system 410 can control RF filtering and selection and sample RF energy via wideband apertures 412. In the example of FIG. 4, the communication interface 420 is an Ethernet switch. The sampled RF energy are analog measurements of the RF electromagnetic spectrum. The software defined radio system 410 can amplify the RF samples, digitize the analog voltage samples, segment (packetize) the digitized RF samples into packets, and stream packetized digitized RF samples out of the software defined radio system 410. The packet format may be for example VITA 49. In the example of FIG. 4, the software defined radio system 410 includes a multi-channel RF tuner 414, a controller 416, and a spectrum streamer 418. The software defined radio system 410 can digitize analog measurements of the RF electromagnetic spectrum sampled through the wideband apertures 412 into digital voltage measurements and stream the packetized digital voltage measurements out of the software defined radio system 410. According to some embodiments, the software defined radio system 410 can be a commercial, off-the-shelf SDR system or device. According to some embodiments, the signal processing system 400 can provide control commands to the software defined radio system 410 to operate the software defined radio system 410 at its maximum sampling rate to process as much wideband spectrum data as possible. That is, the signal processing system 400 can operate the software defined radio system 410 without restricting sampling rates of the software defined radio system 410. According to some embodiments, the software defined radio system 410 may include a multi-channel RF tuner 414 for sampling from a plurality of channels.

According to some embodiments, the controller 416 provides separate interfaces and logical separation of interfaces in the application space that mitigate network contention and control the separation of two different data sampled by the software defined radio system 410. The first type may include large amounts of data handled at massive speeds (on the order of one billion samples per second or a gigahertz of electromagnetic spectrum). The second type may include smaller amounts of data (relative to the first type) and handled at lower speeds (on the order of 1 gigabyte of data per second). The smaller amounts of data input may be due to infrequent and periodic data.

According to some embodiments, the spectrum streamer 418 is configured to maintain time coherency for coherent streams processed through the multi-channel RF tuner 414. According to some embodiments, the spectrum streamer 418 can maintain time coherency by interweaving the packets of spectrum data (samples) on a single destination port of an ingest block of the digital signal processor 430. For example, 200 samples may be interweaved by having discrete intervals of channels for each time hack. The first 100 samples can be channel A corresponding to time hack zero, the next 100 samples can be channel B corresponding to time hack zero, and so forth. By using these discrete time intervals, the controller more efficiently maintains time coherency across that multi-channel RF environment compared to systems configured to connect each channel to a different destination port. In this way, time incoherency that is destructive to the signal processing application space is avoided.

According to some embodiments, the spectrum streamer 418 outputs packetized RF samples (datagrams) that are directed to a DMA manager 432 of the digital signal processor 430 via a bus technology such as the communication interface 420 and a network controller/DMA interface 422 using direct memory access to bypass the CPU. In the example of FIG. 4, the DMA manager includes an ingest block 432a, a decode block 432b, and a coherent transfer kernel 432c. The DMA manager 432 receives the packetized RF samples at the ingest block 432a that prepares the data for decode. The preparation may include using copy kernels (code functions) to manage packetized RF samples and batch the samples for massive parallel processing through the digital signal processer 430. According to some embodiments, the preparation is carried out in a serial way over the bus technology to batch and map the data for parallel decode and processing. That is, the prepared data includes blocks of memory (based on the RF samples received from the software defined radio system 410) that are structured for parallel processing. The ingest block 432a outputs the prepared data. The decode block 432b conducts parallel decoding of the prepared data received from ingest block 432a and outputs the decoded data to a coherent transfer kernel 432c. The coherent transfer kernel 432c maps the decoded data into a memory architecture of a spectrum data system 434 so that the digital signal processor 430 can further process the data. Mapping techniques can include determining what the data looks like—for example, how the data is structured in memory.

According to some embodiments, the spectrum data system 434 uses interchange technology to share wideband spectral data mapped into the memory structures across multiple process space boundaries. The spectrum data system 434 may include a spectrum ingest controller 434a, spectrum data engine 434b, and a spectrum inter-process communication (IPC) handler 434c. The spectrum ingest controller 434a is the intelligence of the spectrum data engine 434b that manages the availability of data coming in from the DMA manager 432. The spectrum ingest controller 434a determines a state of the data in memory and provides instructions based on the determined state of the data. For example, the spectrum ingest controller 434a may determine whether data in memory is stale or timing out. Based on the determinations, the controller can provide instructions such as filling the data. The spectrum ingest controller 434a controls the availability of data coming in from the DMA manager 432. According to some embodiments, the spectrum ingest controller 434a can include a tool that corresponds with an application space 438. When the tool is activated, the tool can instruct the spectrum ingest controller 434a to accomplish a task. For example, the activated tool can instruct the controller to start a new data engine (DSP tap).

In one or more examples, the wideband spectrum data (IQ data) is mapped onto the digital signal processor 430 and the spectrum data engine 434b can take in, structure, and search the decoded data from the DMA manager 432 as fast as it can. The spectrum IPC handler 434c on the other hand enables sharing of the mapped memory architecture to a plurality of applications. The spectrum IPC handler 434c does not enable data sharing by blindly copying the data to process A to process B or to application A, application B, and so forth, as doing so is computationally intensive and would choke the signal processing system 400 when handling high ingest rates (such as gigabytes of data every second being shared with a plurality of different applications). Instead, the spectrum IPC handler 434c employs a zero copy shared access that allows applications to access the mapped memory architecture in parallel.

According to some embodiments, the spectrum data system 434 may implement a temporal memory access method for parallel algorithms to acquire near real-time spectral data via near real-time module 435b and non real-time spectral data via non real-time module 435c. According to some embodiments, the spectrum data engine 434b can handle the data differently based on spectral metadata from a spectral metadata module 435a and based on temporal access information from near real-time module 435b and non real-time module 435c. For example, data coming into the system at near real-time may be stored in memory of the digital signal processor 430 which can be processed and data coming in non real-time may be stored in the system memory of the computing device. When trying to access data mapped in the memory architecture, the spectrum data engine can 434b can identify whether the data requested includes future, past, or current data. In this way, the spectrum data engine 434b enables a capability of instructing the spectrum data engine 434b to review past data and capture it.

According to some embodiments, the digital signal processor 430 includes a receiver manager. In the example of FIG. 4, the receiver manager is an SDR manager 436. The SDR manager 436 can include a control messenger 436a that receives information over an Ethernet interface 437, a tuner proxy controller 436b, and a tuner/streamer tasker 436c. According to some embodiments, the SDR manager 436 is a pattern for the construction of software defined radio controllers within a microservice-based architecture. That is, microservices can be used to control the SDR system 410 or build on an application space 438. A microservice is code that has an open API-interface and performs one function. The one function may be, for example, to detect signal A, to detect all air traffic control communications, or to detect anytime a cell tower in 4G is on. According to some embodiments, the signal processing system 400 may employ a microservice such that the one function of the microservice is carried out. The microservice can utilize the wide-band spectrum processing engine and techniques of the signal processing system 400 to accomplish its function. In this way, the microservice can use features of the signal processing system 400 such as high volume data ingestion, radio control, data access, and high volume data sampling.

Furthermore, a microservice is a type of executable element that can run an operating system. Other examples of executable elements include applications and applications threads. According to some embodiments, a user of the system is not bound to compose their digital signal processing chain by using only one type of executable element. Instead, a user can compose digital signal processing chains that include a mixture of application threads and/or applications and/or microservices.

According to some embodiments, the application space 438 is a pattern that allows for parallel applications to access extreme wideband spectral data mapped to the digital signal processor 430. The application space 438 may include DSP blocks processing 438c, channel extraction 438b, and channel detection 438a. Through the application space 438, FM spectrum may be demodulated all at once via DSP blocks processing 438c and channels may be extracted via channel extraction 438b and detected via channel detection 438a at wideband sample rates. According to some embodiments, the application space 438 may be composable. That is, users can build on the application space 438.

According to some embodiments, the DSP tap data structures constructed by the spectrum data engine 434b can include one or more circular buffers of samples. Meta-data associated with the samples (such as information about the source of the samples, the sampling rate, sensor gain, etc.) can be stored in association with the data in the circular buffers. According to some embodiments, signal processing applications can use the data ingestion described herein to take in new samples (such as new IQ data—representation of the electromagnetic waveform) and can create new shared memory data structures (new DSP taps) configured to process the new samples. The newly created DSP taps may be chained with one or more existing DSP taps to create a processing flow.

The example of FIG. 4 includes converting and storing data from one or more software defined radios. However, the systems and method described herein are not limited to processing data from software defined radios. Instead, it should be understood that data from signals from other types of sensor technologies can be handled in accordance with the techniques described herein to facilitate processing of the signals. For example, data from sensor technologies that generate point cloud data can be handled using the techniques described herein. Examples of these sensor technologies are millimeter wave (mmWave) radar and LiDAR. Packetized digitized samples from one or more sensors associated with the sensor technology can be received by a system, such as system 100 of FIG. 1 and/or system 430 of FIG. 4, converted into a standardized format (such as based on metadata associated with the generation of the samples), and stored in one or more shared memory data structures in memory of an SIMD processor. Data from multiples different sensors can be stored in the same shared data structure or different data structures. The data from multiple different sensors can be combined and stored in the same shared data structure, and applications can access the data to obtain scene information without having to combine the data from the different sensors at the application layer.

Figure 5A:
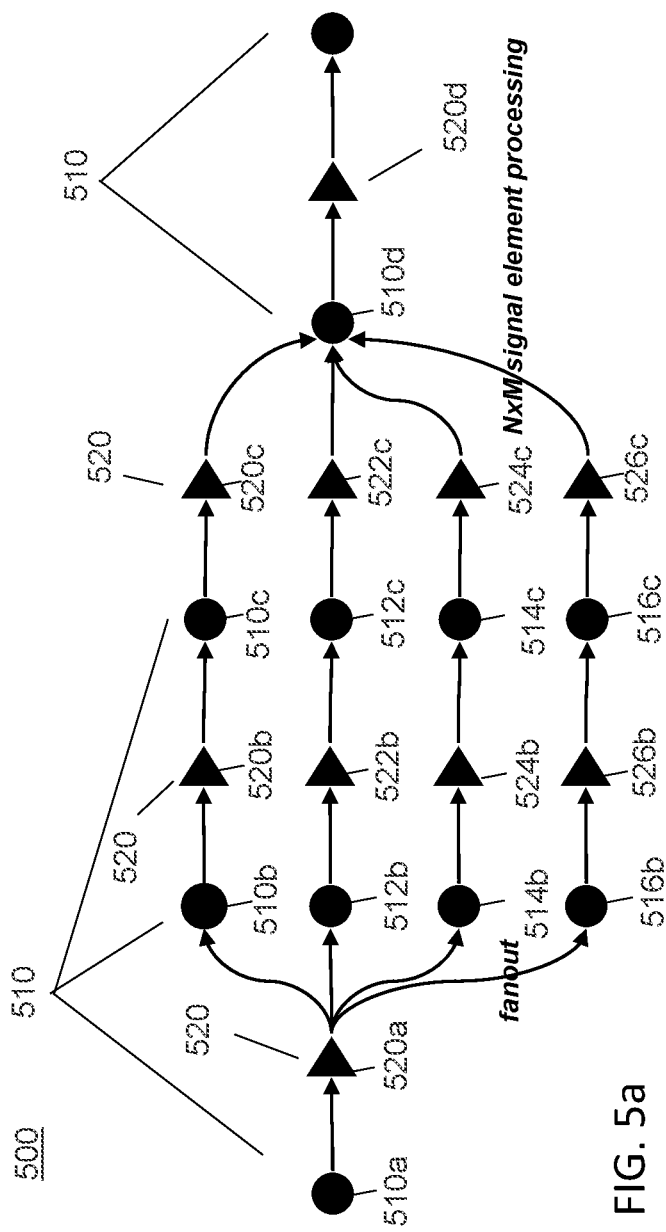
FIG. 5a illustrates a schematic of a digital signal processing block chain, according to some embodiments.

FIG. 5a shows an example of a digital signal processing block chain that does not exert backpressure. FIG. 5a illustrates a schematic of a digital signal processing chain 500, according to some embodiments. In the example of FIG. 5a, the processing elements 510 (illustrated by circles) can be executed in a type of operating system layer. Types of operating system layers of a software stack include an application, application thread, a microservice, or a software container (a self-contained package of executable software that includes all of its software runtime dependencies including those of its host operating system which can execute on a provided container runtime e.g. Docker) and digital signal processing shared memory data structures (DSP taps) 520 (illustrated by triangles). Applications, application threads, microservices, and containers each are different layers of an operating system software stack at which capabilities can be executed. A processing chain flow may include processing elements that are different types of operating system layers. For example, a first processing element may be executed as a microservice layer and a second processing element may be executed as an application layer. In this way, the digital signal processing block chain can be generated across various operating layer bounds.

In the example of FIG. 5a, processing element 510a represents sample ingest of wideband data from a receiver. The receiver may be one or more radios or one or more software defined radios. The ingested samples may be transformed into a standardized format and stored in DSP tap 520a in one or more memories. The wideband samples stored in the DSP tap 520a can be shared for further processing based on one or more processing elements of threads, applications, microservices, and the processing elements can perform a digital signal processing routine on the wideband data. The wideband samples stored in the DSP tap 520a may be accessible to a plurality of processing elements 510b, 512b, 514b, 516b. Each processing element 510b, 512b, 514b, 516b may execute a processing routine to generate processed samples that can be stored respectively in other DSP taps 520b, 522b, 524b, 526b. According to some embodiment, the digital signal processing chain 500 includes parallel processing. For example, processing elements 510b, 512b, 514b, 516b may each execute a first processing routine on transformed data samples from DSP tap 520a to generate first processed samples. The first processed samples from processing elements 510b, 512b, 514b, 516b may be respectively stored in DSP taps 520b, 522b, 524b, 526b. Processing elements 510c, 512c, 514c, 516c may respectively execute a second processing routine on the first processed samples stored in DSP taps 520b, 522b, 524b, 526b to generate second processed samples. The second processed samples from processing elements 510c, 512c, 514c, 516c may be respectively stored in DSP taps 520c, 522c, 524c, 526c. Processing element 510d may execute a third processing routine on the second processed samples in DSP taps 520c, 522c, 524c, and 526c to generate third processed samples. The third processed samples may be stored in DSP tap 520d.

According to some embodiments, one or more of the first processing routine, the second processing routine, and the third and the second processing routine may be different from each other. According to some embodiments, one or more of the first processing routine, the second processing routine, and the third processing routine may be executed in parallel. According to some embodiments, a processing routine executed by one processing element may be different from a processing routine performed by another processing element.

For example, multiple FM channels can be generated from FM data stored in DSP tap 520a such that the second tier of DSP taps 520b represents signals that fully and only contain each of the FM stations in a given area. In this way, another application space or downstream threads in the same application space can perform further processing such as FM demodulation and save the processed data into the next DSP tap 520c downstream, for example can present audio data.

Figure 5B:
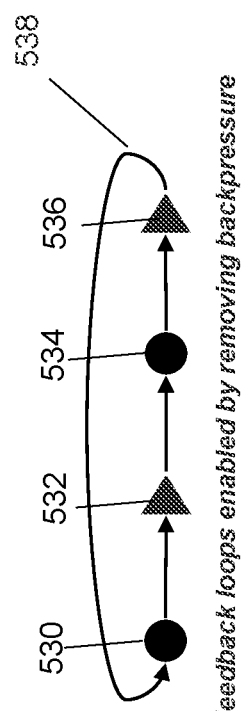
FIG. 5b illustrates an example of back pressure, according to some embodiments.

According to some embodiments, the digital signal processing chain 500 does not perform marshalling of data and relies on the zero copy shared access that is instituted in DSP tap 520. According to some embodiments, the digital signal processing chain 500 does not institute the back pressure. That is, there is no downstream backpressure exerted on upstream processing elements. Back pressure can include a type of notification to slow down processing, for example, because an application cannot match the processing speeds. Without back pressure, the digital signal processing block chain can perform at processing speeds on the order of one billion samples per second or a gigahertz of electromagnetic spectrum. By allowing executable elements the ability to process samples without backpressure, any number of DSP block processing configurations can be achieved. FIG. 5b illustrates a feedback mechanism that can be achieved using existing DSP frameworks at spectral widths greater than 20 MHz. In the example of FIG. 5b, the digital signal processing chain includes processing elements 530, 534, DSP taps 532, 536, and a feedback loop 538 from DSP tap 536 to processing element 530.

Figure 6:
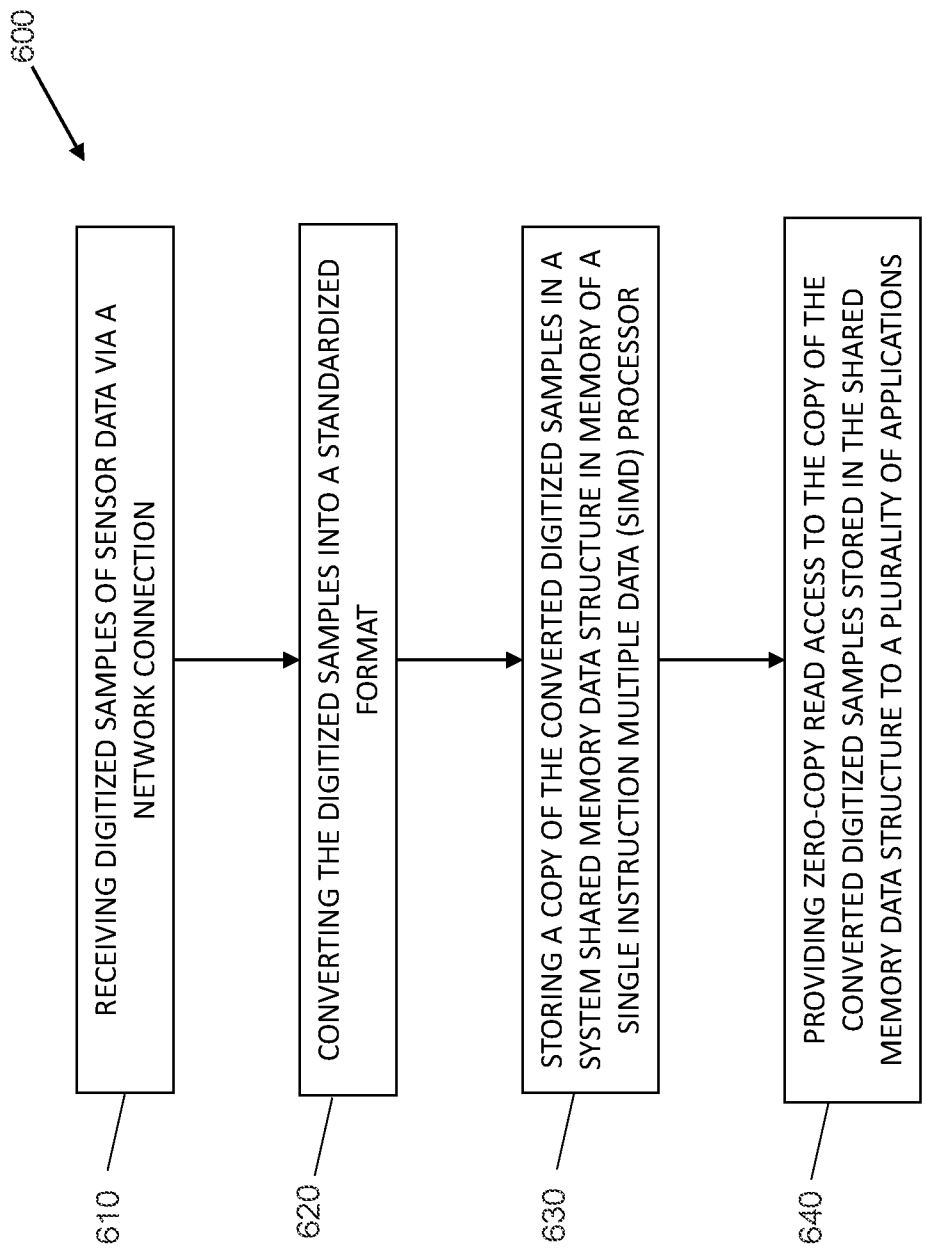
FIG. 6 illustrates an exemplary flowchart of an exemplary method for digital signal processing, according to some embodiments.

FIG. 6 illustrates an exemplary flowchart of an exemplary method for digital signal processing, according to some embodiments. Method 600 can enable processing of large amounts of sensor data received in real time and continuously using computing devices such as personal computers, high-performance computers, and system on chip computer architectures that run multi-tasking operating systems. Method 600 may be performed by a computing system that includes a general purpose processor, such as a CPU, a network interface card, and one or more single instruction multiple data (SIMD) processors, such as one or more graphics processing units.

At step 610, digitized samples of sensor signals may be received via a network connection. The samples may be received from one or more software defined radios or any other sensor system that converts sensor signals into packets of digitized samples. The digitized samples may be contained in packets (e.g., IP packets) generated by the one or more sensor systems (e.g., one or more software defined radios or one or more LiDAR sensors). The packets may be received at a network interface card of the computing system. In some embodiments, the packets may be directed from the network interface card to a memory of the SIMD processor using direct memory access such that the packets bypass the general purpose processor and host RAM.

At step 620, the digitized samples may be converted into a standardized format. The samples may be converted into a format that is different from the format in which it was received. The standardized format can be generated by taking magnitudes of electrical potential whose values are relative to the system that generated them and converting them into absolute values of electrical potential in volts. This can be accomplished by using the meta-data contained in packets that comprise the digitized samples. According to some embodiments, converting the samples may include performing digital signal processing calculations on the samples using meta-data provided by the receiver. The meta-data may include gain, a sampling rate, bandwidth, and timing information associated with the system (e.g., the software defined radio) that generated the digitized samples.

According to some embodiments, converting the samples may include performing bit-wise manipulation of the samples to convert the endianness of the data. Converting the endianness can include, for example, flipping the bit orientation of the data with respect to an original bit orientation of the data received via the network which may vary based on the sensor system. According to some embodiments, converting the samples may include converting the data from its original primitive data type (such as a 16-bit integer) to 32-bit float. The transformed samples are copied into one or more shared memory data structures for subsequent sharing and processing, as discussed above and further below. In this way, the samples from the sensor system (which may include one or more software defined radios, for example) are standardized for subsequent processing and sharing. That is, all the samples ingested are transformed into a standardized format that can be used by applications. According to some embodiments, the samples may be converted into a format that can be processed by the SIMD processor. According to some embodiments, the samples may be converted into single precision floating point numbers for speed purposes.

In some embodiments, packets stored in a memory of a SIMD processor (such as by using direct memory access) are parsed by the SIMD processor to extract the digitized samples. The SIMD processor may convert the digitized samples to the standardized format.

At step 630, the converted standardized digitized samples are stored in a shared memory data structure configured to allow a plurality of applications to read the converted digitized samples for performing digital signal processing on the converted digitized samples. The converted digitized samples may be stored in a shared memory data structure in a memory of an SIMD processor. In some embodiments, the converted digitized samples are additionally or alternatively stored in CPU memory for access by one or more applications and/or application threads executing on the CPU. The shared memory data structure may comprise one or more circular buffers. The one or more circular buffers may be updated continuously as new digitized samples are received. The continuous update of the one or more circular buffers may be unaffected by zero-copy read access of the data in the circular buffer by one or more applications. In other words, one or more applications can read data from the one or more circular buffers without affecting the updating of the circular buffers.

In some embodiments, digitized samples are received from multiple sources and the converted digitized samples from each source are stored in a different shared memory data structure (e.g., a different circular buffer). For example, digitized samples may be received from two different tuners (of the same software defined radio or two different software defined radios) and the converted digitized samples for each may be stored in different shared memory data structures.

In some embodiments, steps 620 and 630 are performed by an SIMD processor (e.g., a GPU). Packets comprising digitized samples are copied directly into SIMD processor memory using direct memory access and are decoded by code executing on the SIMD processor. Code executing on the SIMD processor parses the packets to extract the digitized samples. Code executing on the GPU converts the digitized samples to the standard format and stores the standardized digitized samples from each unique packet into the correct position of the buffer.

At step 640, zero-copy read access to the converted digitized samples in the shared memory data structure is provided to a plurality of applications. This allows each application of the plurality of applications to process the converted digitized data without each application making its own copy of the converted digitized samples. In some embodiments, multiple applications may access the converted digitized data in parallel.

Figure 7:
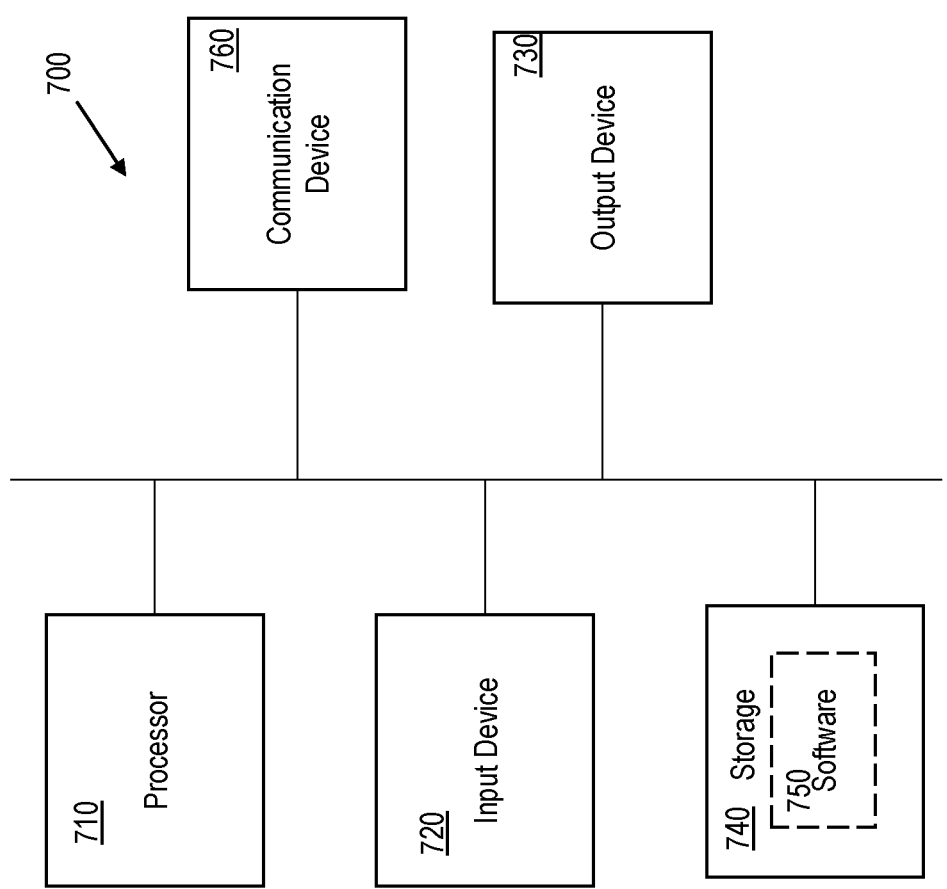
FIG. 7 illustrates an example of a computing device according to examples of the disclosure.

FIG. 7 illustrates an example of a computing device 700 in accordance with some embodiments (such as system 100, 400), or a computing device for implementing method 600. Device 700 can be a host computer connected to a network. Device 700 can be a client computer or a server. As shown in FIG. 7, device 700 can be any suitable type of microprocessor-based device, such as a personal computer, workstation, server, or handheld computing device (portable electronic device) such as a phone or tablet. The device can include, for example, one or more of processor 710, input device 720, output device 730, storage 740, and communication device 760. Input device 720 and output device 730 can generally correspond to those described above and can either be connectable or integrated with the computer.

Input device 720 can be any suitable device that provides input, such as a touch screen, keyboard or keypad, mouse, or voice-recognition device. Output device 730 can be any suitable device that provides output, such as a touch screen, haptics device, or speaker.

Storage 740 can be any suitable device that provides storage, such as an electrical, magnetic, or optical memory including a RAM, cache, hard drive, or removable storage disk. Communication device 760 can include any suitable device capable of transmitting and receiving signals over a network, such as a network interface chip or device. The components of the computer can be connected in any suitable manner, such as via a physical bus or wirelessly.

Software 750, which can be stored in storage 740 and executed by processor 710, can include, for example, the programming that embodies the functionality of the present disclosure (e.g., as embodied in the devices as described above).

Software 750 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 740, that can contain or store programming for use by or in connection with an instruction execution system, apparatus, or device.

Software 750 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic, or infrared wired or wireless propagation medium.

Device 700 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 700 can implement any operating system suitable for operating on the network. Software 750 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A method for digital signal processing of sensor data, comprising:
   receiving digitized samples of sensor signals via a network connection from a plurality of sensors;
   converting the digitized samples into a standardized format, wherein converting the digitized samples into a standardized format comprises converting the digitized samples from relative values that are relative to a sensor of the plurality of sensors that generated the digitized samples to absolute values;
   storing the converted digitized samples in a shared memory data structure in memory of a single instruction multiple data (SIMD) processor; and
   providing zero-copy read access to the converted digitized samples stored in the shared memory data structure to a plurality of applications.

2. The method of claim 1, wherein the digitized samples are of the radio frequency electromagnetic spectrum.

3. The method of claim 2, wherein the digitized samples are received from one or more software defined radios.

4. The method of claim 1, wherein receiving the digitized samples comprises using direct memory access (DMA) to direct network packets comprising the digitized samples from a network interface card (NICs) directly to the memory of the SIMD processor.

5. The method of claim 4, where the SIMD processor parses the packets to extract the digitized samples.

6. The method of claim 1, comprising receiving meta-data associated with the digitized samples, wherein the digitized samples are converted into the standardized format using the meta-data.

7. The method of claim 6, wherein the meta-data comprises information associated with the plurality of sensors that generated the digitized samples.

8. The method of claim 7, wherein the shared memory data structure comprises a circular buffer and the circular buffer is free of the meta-data.

9. The method of claim 1, wherein the shared memory data structure comprises a circular buffer.

10. The method of claim 9, wherein the circular buffer is continuously updated as at least one of the plurality of applications accesses the converted digitized samples in the circular buffer.

11. The method of claim 1, wherein the SIMD processor is a graphics processing unit (GPU).

12. The method of claim 1, wherein the converted digitized samples stored in the shared memory data structure are accessible in parallel by at least two of the plurality of applications.

13. The method of claim 1, comprising executing a first processing routine from a first application of the plurality of applications to yield first processed samples and storing a copy of the first processed samples in a second shared memory data structure in the memory of the SIMD processor.

14. The method of claim 13, comprising executing a second processing routine from the first application or a second application of the plurality of applications on the first processed samples in the second shared memory data structure to yield second processed samples.

15. The method of claim 14, wherein the first processing routine is performed independent of a processing speed of the second processing routine.

16. The method of claim 1, wherein storing the converted digitized samples comprises storing a first set of digitized samples associated with a first RF tuner in a first shared memory data structure and storing a second set of digitized samples associated with a second RF tuner in a second shared memory data structure.

17. The method of claim 1, wherein the digitized samples comprise mmWave radar data or LiDAR data.

18. A system for digital signal processing of sensor data, comprising:
   one or more processors;
   memory; and
   one or more programs stored in the memory and configured for execution by the one or more processors, the one or more programs including instructions for:
      receiving digitized samples of sensor signals via a network connection from a plurality of sensors,
      converting the digitized samples into a standardized format, wherein converting the digitized samples into a standardized format comprises converting the digitized samples from relative values that are relative to a sensor of the plurality of sensors that generated the digitized samples to absolute values,
      storing the converted digitized samples in a shared memory data structure in memory of a single instruction multiple data (SIMD) processor, and providing zero-copy read access to the converted digitized samples stored in the shared memory data structure to a plurality of applications.

19. The system of claim 18, wherein the digitized samples are of the radio frequency electromagnetic spectrum.

20. The system of claim 19, wherein the system is configured to receive the digitized samples from one or more software defined radios.

21. The system of claim 18, wherein receiving the digitized samples comprises using direct memory access (DMA) to direct network packets comprising the digitized samples from a network interface card (NICs) directly to the memory of the SIMD processor.

22. The system of claim 21, where the SIMD processor is configured to parse the packets to extract the digitized samples.

23. The system of claim 18, wherein the one or more programs include instructions for receiving meta-data associated with the digitized samples, wherein the digitized samples are converted into the standardized format using the meta-data.

24. The system of claim 23, wherein the meta-data comprises information associated with the plurality of sensors that generated the digitized.

25. The system of claim 24, wherein the shared memory data structure comprises a circular buffer and the circular buffer is free of the meta-data.

26. The system of claim 18, wherein the shared memory data structure comprises a circular buffer.

27. The system of claim 26, wherein the one or more programs include instructions for continuously updating the circular buffer as at least one of the plurality of applications accesses the converted digitized samples in the circular buffer.

28. The system of claim 18, wherein the SIMD processor is a graphics processing unit (GPU).

29. The system of claim 18, wherein the converted digitized samples stored in the shared memory data structure are accessible in parallel by at least two of the plurality of applications.

30. The system of claim 18, wherein the one or more programs include instructions for executing a first processing routine from a first application of the plurality of applications to yield first processed samples and storing a copy of the first processed samples in a second shared memory data structure in the memory of the SIMD processor.

31. The system of claim 30, wherein the one or more programs include instructions for executing a second processing routine from the first application or a second application of the plurality of applications on the first processed samples in the second shared memory data structure to yield second processed samples.

32. The system of claim 31, wherein the one or more programs include instructions for performing the first processing routine independent of a processing speed of the second processing routine.

33. The system of claim 18, wherein the one or more programs include instructions for storing a first set of digitized samples associated with a first RF tuner in a first shared memory data structure and storing a second set of digitized samples associated with a second RF tuner in a second shared memory data structure.

34. The system of claim 18, wherein the digitized samples comprise mmWave radar data or LiDAR data.

35. A non-transitory computer readable storage medium storing one or more programs, the one or more programs comprising instructions, which when executed by a computing system, cause the computing system to:
receive digitized samples of sensor signals via a network connection from a plurality of sensors;
convert the digitized samples into a standardized format, wherein converting the digitized samples into a standardized format comprises converting the digitized samples from relative values that are relative to a sensor of the plurality of sensors that generated the digitized samples to absolute values;
store the converted digitized samples in a shared memory data structure in memory of a single instruction multiple data (SIMD) processor; and
provide zero-copy read access to the converted digitized samples stored in the shared memory data structure to a plurality of applications.

* * * * *